Patented Dec. 10, 1940

2,224,399

UNITED STATES PATENT OFFICE 2,224,399

PRODUCTION OF CANNED HAM

Stephan L. Komarik, Chicago, Ill., assignor to The Griffith Laboratories, Inc., Chicago, Ill., a corporation of Illinois No Drawing. Application October 23, 1939, Serial No. 300,787

17 Claims. (Cl. 99—187)

The present invention relates generally to the canning of hams and particularly to the cooking of canned raw hams.

Heretofore, hams have been canned after being preliminarily shaped and cooked in a "ham boiler." A "ham boiler" is a rigid container of the shape of the can, and is equipped with a flat cover or grid device to compress the ham to fit the container. The raw boned ham is placed in the boiler and immersed in water where it is cooked to set the ham to the desired shape. In cooking for 3 to 4 hours, there is a shrinkage with loss of 15% or more of valuable meat juices into the cooking water. The cooked ham is then chilled in order to permit it to be vacuum-sealed in a can. The canned chilled ham is then cooked again for 5 to 6 hours in a water bath of 165° to 170° F., until the coldest part is at 160° F., during which time a second shrinkage of 12% to 15% of juices takes place forming a meat jelly in the can outside the ham. From raw to marketed ham the ham body thus loses from 25% to 30% of its juices.

Then came the improvement set forth in Komarik U. S. Serial No. 261,799, filed March 14, 1939, as a continuation in part of Serial No. 196,244, filed March 16, 1938. According to this improvement, the raw ham is forced while chilled, into a confined can by mechanical pressure, and vacuum sealed therein. Thus, there is conserved in the can those juices which entered the water in which the ham in the "ham-boiler" was cooked. The sealed raw ham is then cooked by any suitable process, not disclosed in detail in said applications.

However, in practice of said improvements the canned raw ham was placed in a water bath of 176° F. and cooked until the coldest part of the ham reached at least 152° to 160° F. The lower limit was set by certain governmental regulations. To reach 152° F. took 7 hours. To reach 160° F. it took only 9½ hours.

One objective of such improvement was to retain for marketing all the natural juices of the ham, thus avoiding economic loss and consequent higher costs of the older process. Another object was to minimize free space in the can by packing raw hams under heavy pressure, to minimize space for holding juice or jelly. The latter made the ham unattractive on opening and the jelly is easily wasted by those desiring meat as the edible. The longer the time of cooking, the greater is the tendency to shrink and exude juices. Hence, the time was made as short as permissible, and the minimum permissible (by regulation) temperature was made the objective, namely 152° F. The lower temperature saved 2½ hours of cooking with a consequence of less purging, and a quite satisfactory minimum. Where the higher desirable temperature of 160° F. was attained by prolonging the same procedure, namely immersion in water of 176° F., the purging of juice into the can was from 12% to 20% of the original raw ham juices, which is still considerably less than in the older process. However, this process in either case avoided the economic loss of juices resulting from use of the ham boiler.

In certain jurisdictions there is now a requirement that the final inside temperature be 160° F. and not 152° F. To meet this condition with the old procedure of immersion in a 176° F. water bath, calls for too long a time with an increase in purging compared to the standards set in stopping at 152° F. inside temperature. Therefore, the changed requirements create the problem of cooking to higher final temperature while meeting a standard of low purging.

One object of the present invention is to improve the cooking procedure for canned raw hams, so as to permit attaining a final inside temperature of 160° F. with a minimum of cooking and a comparatively decreased purging of juices into the can.

Another object of the invention is to improve the cooking procedure and to improve the flavor of the ham, by splitting the total heating period, following canning of the chilled ham, into a non-cooking heating period and a cooking period.

Still another object of the invention is to divide the cooking period into a high temperature heat application to cook quickly the exterior layers of the ham before cooking the interior portion, and into one or more lower temperature heat applications sufficient rapidly to attain the desired final goal of 160° F. without general overcooking.

In carrying out the invention other considerations enter into the preparation of the ham for canning. These are not essential to the process, and are in nature customary treatments which may be omitted or practiced in accordance with desire. However, they may be conducted so as to benefit the results primarily aimed at.

Herein, where the term "raw ham" is used, this contemplates a cured ham, whether cured by brine or smoke, or both. In brine-curing of hams, the preferred procedure is to pump liquid pickle (usually a brine of sodium chloride, and a nitrite or nitrate of sodium or both) into the ham via the arteries. Thus the amount of salts added may be controlled. It is a common practice to soak such artery-pumped hams in a cover pickle. This results in the surface layers taking up too much salt, giving a non-uniform cure. Also, it results in the surface being soft and soggy, containing excess of liquid which enhances purging in the can. In preference to such practice, where it is desired to add pickle salt to the surface layers of an artery-pumped ham, the surface is rubbed with controlled amounts of dry curing salt, which may be the same or different from the content of the pumping pickle. The dry rubbing is a known practice but its choice use is beneficial to the results desired in the present invention. It dries out the ham surface, where there are open pores, and helps to retain juices in the surface layers. The quantity-control of rubbing salt made with reference to the control of pumped salt may lead to uniform cures.

After the hams are cured as above, they are thoroughly washed, boned, fatted and drained, whereby they become suitably conditioned for canning as is well known. These prepared hams, while still raw may be smoked or not, as desired, by any suitable smoking procedure, which does not over-heat the ham. To over-heat, will loosen the fat tissues of one side of the ham and render the fat, building up a crust on the meat which retards the desired quick penetration of heat into the ham after canning.

The raw smoked or unsmoked ham, when chilled usually from 36° to 42° F., is then suitable to be packed raw into cans and vacuum sealed. To effect vacuum sealing the ham may not be too warm, which condition permits excessive water vapor to escape through the can-vent to be sealed, while the vent is exposed to an evacuating atmosphere. To assure successful evacuation and sealing, it is customary to limit the extraction of water as vapor through the vent by using chilled hams.

A suitable machine and process for packing the raw hams into the cans is described and claimed in the above mentioned Komarik applications, and also Griffith application U. S. Serial No. 270,336, filed April 27, 1939. The machine packs the ham into a can of selected size, under heavy pressure to assure a minimum of free space. The pressure may be as high as 260 lbs. per sq. inch. The evacuation expands the ham to fit the can. The sealed ham is now ready to cook. As stated above, the old procedure is herein improved.

In order to illustrate the nature of the changes and the improvements, the old process and the preferred operation of the new process have been carried out on canned hams of similar size, equipped in the interior with pyrometers to measure the actual temperature changes of the remote interior. The process is described and claimed with reference to attainment of interior temperatures, as this is the practical objective successfully to can hams, and to meet government requirements. Actually, in practicing the invention, each can is not measured as to its coldest part, but the procedure is worked out experimentally, and is controlled carefully to assure such result. Any changes made in the control may be tested by measurement of a particular can.

It is also to be noted that the process is one of heat transfer from the exterior of the can to the remotest interior. The distance varies with the size of can. Thus a procedure just perfect for a small sized canned ham would fall short of time for a larger size of can. This must be considered in prescribing a fixed control. Any smaller can may be cooked with a batch of suitably cooked larger cans. Preferably, however, it is best in large establishments to sort the cans and treat the assorted sizes with slightly different control. In smaller establishments, the control should be chosen on the basis of the largest cans in the batch.

For general purposes, the cans run in height from 3¾ inches to 6 inches, with parallel oval-like top and bottom about 10½ inches x 7½ inches. In such a set, the distance for heat transmission will vary roughly from 2 to 3 inches. The tests herein reported have been carried out on 10 lb. hams in a can 4¾ inches high.

*The warming step*

Experience in developing the present invention has indicated that there is a better flavor to the hams processed by the divided heating. This has been studied and developed upon the basis that at lower non-cooking temperatures there is a ripening action, probably of enzymic character, in the ham producing flavoring amino-acids. In the old procedure of immersing the cans in a cooking bath (176° F.), the meat is exposed for shorter periods of time to the lower temperatures, thus retarding the development of flavor. The first step is controlled in part to favor this action. However, it is more importantly controlled to add heat units to the sealed ham without cooking, or attaining those results of cooking which tend to release juices. For this reason the wall-layers are not allowed to go above 120° F., and this is the upper limit of temperature for the water bath in which the can is heated in the first stage. It is well-known that cooking begins at about 117° to 120° F. An early change in "cooking" is coagulation of para-myosinogen, at about 117° to 120° F. This substance constitutes about 25% of the protein of the plasma. At about 132° F. the myosinogen coagulates. This substance constitutes about 75% of the protein of the muscle plasma. The formation of amino-acids for flavor is more highly favored in raw flesh before any cooking begins, and more favorable in warm than cold hams. Therefore, in the flavoring period the meat must not attain a cooking temperature anywhere.

The foregoing indicates that the ham might safely reach an over-all temperature just under about 120° F. But to do this the canned ham must be exposed to a temperature not higher than this. To heat a chilled ham in a can to an interior temperature of 120° F. from an exposure to 120° F. is practically impossible, in point of time involved, as an industrial operation, and for reasons of other reactions in the ham. To cut the time, a lower inside temperature limit must be imposed, consistent with commercial economy and with effect on the ham, while obtaining the advantage of forming amino-acid flavor. From experience, the specific process adopted is to heat the can in a bath at 120° F. with the objective of reaching an inside temperature of 95° F. Beginning with chilled hams at 40° F., this occurs in 210 minutes, allowing flavor to develop in all the ham before any cooking. The outside is not excessively favored in this respect, because it will be seen (table below) that after this warming period the center has about 85 minutes of time above 95° F. before cooking begins, to compensate for the time when it is cooler than 95° F.

The can may be taken out of the bath for transfer to the next step, when the inside has reached 92° F. The warmer outside layers still continue to heat the interior. Substantially the same time and flavor results are obtained with a bath of 115° F., to attain an inside temperature of 90° F. Accordingly, the first step is considered to involve heating the chilled can ham to an inside temperature of 90° to 95° F. from an exposure to 115° to 120° F., preferably in a water bath for ease of control. During this step there is no action tending to purge juices, because there is no cooking. However, an important result is the addition of non-cooking heat units to the ham. This lowers the time later required to add heat units while cooking.

The cooking

After the warming and flavoring period the ham is ready to be cooked. A minimum of time is the objective to minimize purging. Other conditions are imposed to the same end. The first step is to cook the outside layers of the ham, thus to coagulate the protein to act as a seal against purging, and also to introduce heat units quickly and to push heat rapidly to the interior of the can. The extent to which the ham is thus quickly cooked is not too deep and therefore over-cooking at the surface is not a serious objection. Ham and ham products are commonly cooked at temperatures well above 212° F., as for example 227° F. However, the same effects of cooking are produced at temperatures below 212° F. The latter temperature is referred to, as it is practically convenient one for control, obtainable by immersing the cans in boiling water. Nevertheless, it is not considered as a limiting one for the results desired. Where 212° F. has been used, it is practiced for 25 to 30 minutes. Where a temperature of 200° F. is used it is practiced for 30 to 35 minutes. Where it is 230° F. it is practiced for 17 to 22 minutes. At 190° F. the time is 35 to 40 minutes. Therefore, it will be seen that the time of the total cooking is not greatly changed by a considerable variation in the temperature of this step. The lower limit must be appreciably higher than the temperature of the next step. For the desired effects, the lower limit of the high-heat period, should be 20° greater than the heat of the next step. Considering the limits of the next step, given below, the high heat step may be from 190° upwards for a time varying at the lowest temperature from 35 to 40 minutes at the rate of about ½ a minute less for each degree over 190° F. Thus, at 212° F., this formula gives 24 to 29 minutes, which is consistent with actual practice of 25 to 30 minutes.

The prolonged cooking

The high-heat period will have introduced heat units at the surface, while the center has a heat around 95° F. Thus, following the old procedure of immersing in a bath of 176° F., will naturally give a shorter time to attain 160° F. in the center, compared to the time of the older process. This procedure may be followed in the present invention. However, the bath may be at a lower temperature because of the heat units already added at the surface. There may even be a short period where heat is extracted from the can, but any layers above the 176° F. bath (or its variation) will also be passing heat inwardly, which is the desired result, and the loss of heat units from the can will not be great or detrimental. The bath is not necessarily continued until the center heat is exactly 160° F., because upon removal from the bath, the transfer will continue. It may be stopped at any place over 155° F. where 160° F. is the objective.

However, it has been found that the process may be more readily controlled to have the can finished with a more uniform heat, by lowering the temperature of the bath during the period, so as to cool the outer layers while the middle layers are transferring heat to the center. Therefore, 40% to 60% of the period after the high heat is conducted at a temperature from 170° to 180° F., while the remainder is conducted at 5° to 15° F. lower. Within these limits the actual cooking time is shorter than the old procedure of immersing the chilled canned ham in a bath at 176° F. until the center reaches 152° F. or 160° F. And furthermore the time of cooking for the outer layers is greatly shortened whereby a more uniform cooking prevails throughout the ham.

The process is illustrated and also compared with the old results, in the following table, wherein column 1 shows minutes; column 2 shows the bath temperature and column 3 shows the inside temperature of a 10 lb. ham in the old process; column 4 shows the new bath temperatures; and column 5 shows the inside temperature of a 10 lb. ham by the new process.

|  | Old method | | New method | |
|---|---|---|---|---|
| 1<br>Minutes | 2<br>Bath,<br>° F. | 3<br>Ham,<br>° F. | 4<br>Bath,<br>° F. | 5<br>Ham,<br>° F. |
| 0 | ------ | 40 | ------ | 40 |
| 30 | 176 | 41 | 120 | 41.5 |
| 60 | 176 | 54 | 120 | 47 |
| 90 | 176 | 72 | 120 | 55 |
| 120 | 176 | 89 | 120 | 64 |
| 150 | 176 | 105 | 120 | 71.5 |
| 180 | 176 | 114 | 120 | 85 |
| 210 | 176 | 123 | 120 | 95 |
| 210 | 176 | 123 | 212 | 95 |
| 240 | 176 | 131 | 212 | 103 |
| 270 | 176 | 138 | 176 | 110 |
| 300 | 176 | 142 | 176 | 122 |
| 330 | 176 | 145 | 176 | 133 |
| 360 | 176 | 148 | 165 | 142 |
| 390 | 176 | 150 | 165 | 148 |
| 420 | 176 | 152 | 165 | 152 |
| 450 | 176 | 153 | 165 | 155 |
| 480 | 176 | 154 | 165 | 160 |
| 510 | 176 | 156 | ------ | ------ |
| 540 | 176 | 158 | ------ | ------ |
| 570 | 176 | 160 | ------ | ------ |

From the foregoing, it is seen that from the beginning at 40° F., it takes only 8 hours to reach 160° F. where the old procedure required 9½ hours. In the old procedure the outer layers were cooking for a little short of 9½ hours, and the center was cooking (120° F.) for 7½ hours. By the new procedure, the outer layers are cooking for a little short of 6 hours and 10 minutes, while the center is cooking for only 3 hours and 5 minutes. The purging from the whole ham is thus considerably lessened. By the new procedure, the purging is under about 12% of the juices, compared to results near 20% by the illustrated old procedure. Where the old procedure is stopped at 152° F., as above described, the time is lowered by 145 minutes, and the total time is even less than by the new procedure to reach 160° F. Nevertheless, the purging is still greater than 12% by reason of the longer time of actual cooking during the total time.

It is therefore to be seen that the process gives less purging than the older procedure conducted to attain either 152° or 160° F. The necessity of carrying out the old process to attain 160° F.

created a problem in purging, which is overcome by the new process. Yet where it is desired still to attain only 152° F., the new process is useful to give less purging and better flavor, in spite of substantially identical total times (see 420 minutes in table). This is because the actual cooking period in that time is less in the new process.

Accordingly the present invention is broadly applicable to stoppage at 152° to 160° F., and most advantageous for the more exacting requirement of stopping at 160° F.

Another very important feature of the process, which was a collateral objective in devising the process, is that the hams sealed in the cans can be taken from the chill room and processed to completion in 8 hours by operators on an 8-hour shift. Thus the responsibility for the cans may be allocated to one shift and not divided, with labor difficulties involved.

The process may vary as indicated and as comprehended within the scope of the appended claims.

I claim:

1. The method of cooking a sealed can containing raw ham, which comprises heating the can from a chill temperature of about 40° F. by exposure to a temperature of 115° to 120° F. until the coldest part of the ham attains a temperature of 90° to 95° F., heating the can by exposure to a cooking temperature upwardly from 190° F. for 35 to 40 minutes less about ½ minute for each degree over 190° F., said temperature being at least 20° F. higher than the temperature A below, and heating the can by exposure to temperature A not over 180° F. and not under 165° F. until the coldest part of the ham attains a temperature in the range from 152° to 160° F.

2. The method of cooking a sealed can containing raw ham, which comprises heating the can from a chill temperature of about 40° F. by exposure to a temperature of 115° to 120° F. until the coldest part of the ham attains a temperature of 90° to 95° F. heating the can by exposure to a cooking temperature upwardly from 190° F. for 35 to 40 minutes less about ½ minute for each degree over 190° F., said temperature being at least 20° F. higher than the temperature A below, heating the can by exposure to a temperature A initially in the range from 170° to 180° F. until the coldest part of the ham attains a temperature in the range from 152° to 160° F., and reducing the initial range of temperature A by 5° to 15° F. in 40% to 60% of the time period required after the beginning of temperature A in attaining a temperature of 152° to 160° F. at the coldest part of the ham.

3. The method of cooking a sealed can containing raw ham, which comprises heating the can from a chill temperature of about 40° F. by exposure to a temperature of 115° to 120° F. until the coldest part of the ham attains a temperature of 90° to 95° F., heating the can by exposure to a cooking temperature upwardly from 190° F. for 35 to 40 minutes less about ½ minute for each degree over 190° F., said temperature being at least 20° F. higher than the temperature A below, and heating the can by exposure to a temperature A not over 176° F. until the coldest part of the ham attains a temperature of 152° to 160° F.

4. The method of cooking a sealed can containing raw ham, which comprises heating the can from a chill temperature of about 40° F. by exposure to a temperature of 115° to 120° F. until the coldest part of the ham attains a temperature of 90° to 95° F., heating the can by exposure to a cooking temperature upwardly from 190° F. for 35 to 40 minutes less about ½ minute for each degree over 190° F., said temperature being at least 20° F. higher than the temperature A below, heating the can by exposure to a temperature A of initially about 176° F. until the coldest part of the ham attains a temperature in the range from 152° to 160° F., and reducing the last mentioned temperature to not lower than 155° F. in 40% to 60% of the time period required after the beginning of temperature A for the coldest part of the ham to attain a temperature of 152° to 160° F.

5. The method of cooking a sealed can containing raw ham, which comprises heating the can from a chill temperature of about 40° F. by exposure to a temperature of 115° to 120° F. until the coldest part of the ham attains a temperature of 90° to 95° F., heating the can by exposure to a cooking temperature upwardly from 190° F. for 35 to 40 minutes less about ½ minute for each degree over 190° F., said temperature being at least 20° F. higher than the temperature A below, heating the can by exposure to a temperature A of initially about 176° F. until the coldest part of the ham attains a temperature in the range from 152° to 160° F., and reducing the last mentioned temperature to about 165° F., in 40% to 60% of the time period required after the beginning of temperature A for the coldest part of the ham to attain a temperature of 152° to 160° F.

6. The method of cooking a sealed can containing raw ham, which comprises heating the can from a chill temperature of about 40° F. by exposure to a temperature of 115° to 120° F. until the coldest part of the ham attains a temperature of 90° to 95° F., heating the can by exposure to a cooking temperature upwardly from 190° F. for 35 to 40 minutes less about ½ minute for each degree over 190° F., said temperature being at least 20° F. higher than the temperature A below, heating the can by exposure to a temperature A of initially about 176° F. until the coldest part of the ham attains a temperature in the range from 152° to 160° F., and reducing the last mentioned temperature to about 165° F. in 40% to 60% of the time period required after the beginning of temperature A for the coldest part of the ham to attain a temperature of 160° F.

7. The process of claim 1 in which the said cooking temperature is that of boiling water for 25 to 30 minutes.

8. The process of claim 2 in which the said cooking temperature is that of boiling water for 25 to 30 minutes.

9. The process of claim 3 in which the said cooking temperature is that of boiling water for 25 to 30 minutes.

10. The process of claim 4 in which the said cooking temperature is that of boiling water for 25 to 30 minutes.

11. The process of claim 5 in which the said cooking temperature is that of boiling water for 25 to 30 minutes.

12. The process of claim 6 in which the said cooking temperature is that of boiling water for 25 to 30 minutes.

13. The method of cooking a sealed can containing raw ham, which comprises heating the can from a chill temperature of about 40° F. by exposure to a temperature of 120° F. until the coldest part of the ham attains a temperature of 90° to 95° F., heating the can by exposure to the temperature of boiling water for 25 to 30 minutes, heating the can by exposure to a temperature of about 176° F. for 95 to 145 minutes, and reducing the last mentioned exposure to 165° F. until the coldest part of the ham attains a temperature of 160° F.

14. The method of cooking a sealed can containing raw ham, which comprises heating the can from a chill temperature of about 40° F. by exposure to a temperature of 120° F. until the coldest part of the ham attains a temperature of 90° to 95° F., heating the can by exposure to the temperature of boiling water for 25 to 30 minutes, heating the can by exposure to a temperature of about 176° F. for about 2 hours, and reducing the last mentioned exposure to 165° F. until the coldest part of the ham attains a temperature of 160° F.

15. The method of cooking a sealed can containing raw ham, which comprises heating the can from a chill temperature of about 40° F. by exposure to a temperature permitting the interior of the ham to attain at least 90° F. and the exterior to attain a temperature not over 120° F. while preserving the edible quantity of the ham if it is thereafter promptly cooked, subjecting the can to a cooking temperature above 190° F. for a short period of time to effect coagulation in the surface layers of the ham whereby to seal the said layers of the ham to minimize passage of juices of the ham, and thereafter cooking the ham by exposure to a temperature under 180° F. to attain a temperature at the coldest part of the ham of at least 152° F.

16. The method of cooking a sealed can containing raw ham, which comprises heating the can from a chill temperature of about 40° F. by exposure to a temperature permitting the interior of the ham to attain at least 90° F. and the exterior to attain a temperature not over 120° F. while preserving the edible quantity of the ham if it is thereafter promptly cooked, subjecting the can to a cooking temperature above 190° F. for a short period of time to effect coagulation in the surface layers of the ham whereby to seal the said layers of the ham to minimize passage of juices out of the ham, and thereafter cooking the ham by exposure to a temperature under 180° F. to attain a temperature at the coldest part of the ham of at least 160° F.

17. The method of cooking a sealed ham in a can which comprises ripening the ham by exposing the chilled ham to a non-cooking temperature of not over 120° F. and above 90° F., exposing the can to a cooking temperature above 190° F. for a short time to effect a quick and superficial cooking of the surface layers of the ham in providing a seal for juices in the ham, and then subjecting the ham to a temperature to attain an interior temperature of 160° F. in a period of approximately 8 hours from the beginning of the heat treatment of the chilled ham.

STEPHAN L. KOMARIK.